United States Patent [19]

Mesnel et al.

[11] 4,067,146
[45] Jan. 10, 1978

[54] SEALING JOINTS FOR AUTOMOBILE BODY AND AN EXTRUSION HEAD FOR EXTRUDING SUCH JOINTS

[76] Inventors: Francois Mesnel, 6 Bis rue Salignac Fenelon, Neuilly-sur-Seine; Gerard Mesnel, 17 rue Victor-Hugo, Carrieres-sur-Seine, both of France

[21] Appl. No.: 684,373

[22] Filed: May 7, 1976

[30] Foreign Application Priority Data

July 8, 1975 France ............................ 75.21344
July 30, 1975 France ............................ 75.23720

[51] Int. Cl.² ........................................ E06B 7/23
[52] U.S. Cl. .................................... 49/490; 49/495; 49/498
[58] Field of Search ............... 49/490, 491, 493, 496, 49/497, 498, 495, 485; 52/716–718

[56] References Cited

U.S. PATENT DOCUMENTS

| | | | |
|---|---|---|---|
| 2,099,597 | 11/1937 | Carr, Jr. | 49/490 |
| 2,622,286 | 12/1952 | Beck | 49/497 |
| 3,461,517 | 8/1969 | Eisenhard | 49/495 X |
| 3,883,993 | 5/1975 | Pullan | 49/490 |

*Primary Examiner*—Philip C. Kannan
*Attorney, Agent, or Firm*—Raymond A. Robic; Francis B. Francois; Arthur Schwartz

[57] ABSTRACT

Tubular sealing joint mounted along the edge of a closure element of an automobile body. It comprises a tubular member made of flexible extruded material and having a longitudinal sealing face coming in contact with another closure element of the automobile body, in closed condition of the closure elements. It is provided with spaced groups of parallel flexible sealing lips extending along the tubular member and contiguously disposed transversely of the tubular member, the flexible sealing lips being intended to compensate localized flattening of the tubular member and being integral with it. Also disclosed is an extrusion head for extruding the sealing joint, comprising a die having a central core and an outer bored body spacedly surrounding the core to define therebetween a passage for the extrusion of an elongated tubular member. The outer body is formed along a portion of its bore with contiguous lip-forming grooves opening into the extrusion passage. A diaphragm plate is in contact with the outer body and has an inner surface corresponding in shape with the bore portion of the outer body and is formed with like contiguous grooves defining lips therebetween. The diaphragm plate is rocked from a position wherein the lips of the diaphragm plate lie over the grooves of the outer body to obturate them and a position wherein the lips lie away from them to liberate them for the extrusion of flexible lips over a predetermined length of the tubular member.

4 Claims, 11 Drawing Figures

U.S. Patent  Jan. 10, 1978  Sheet 1 of 3  4,067,146
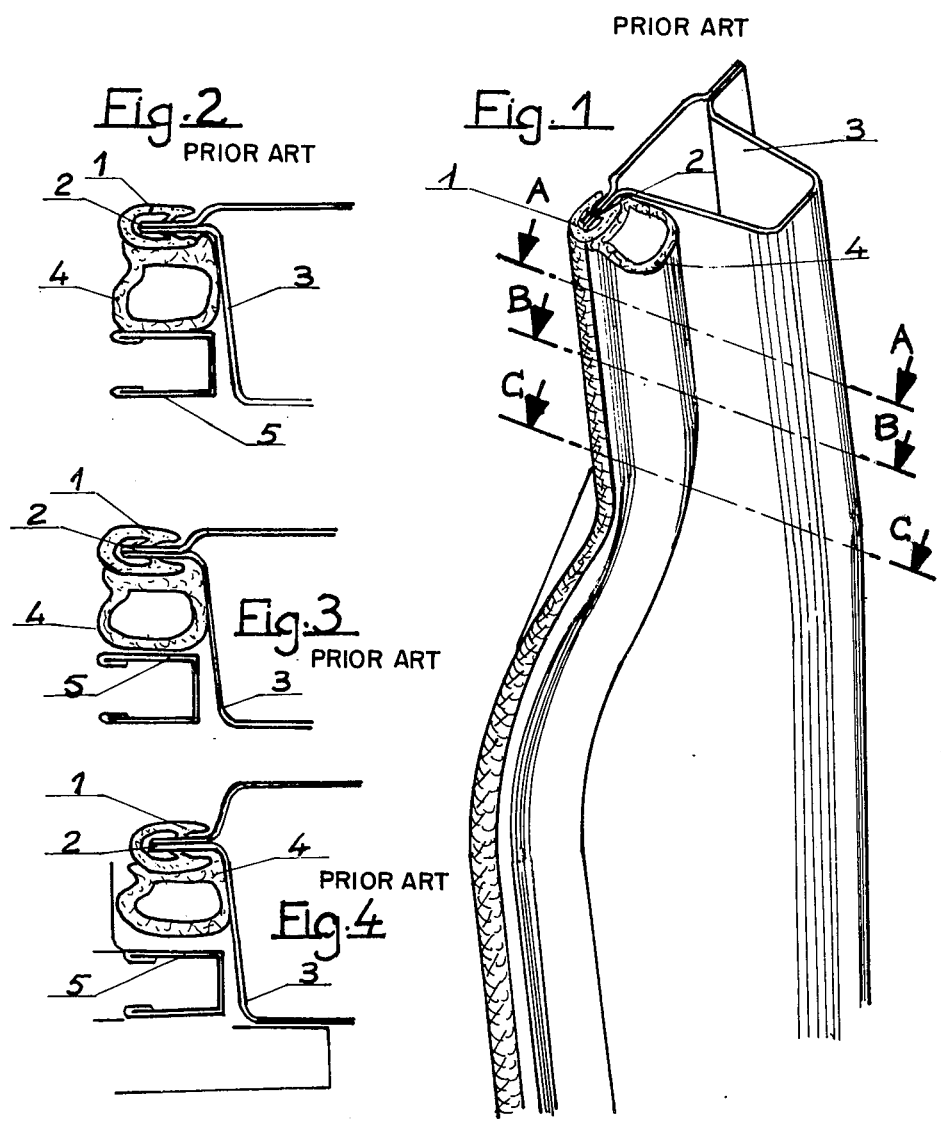

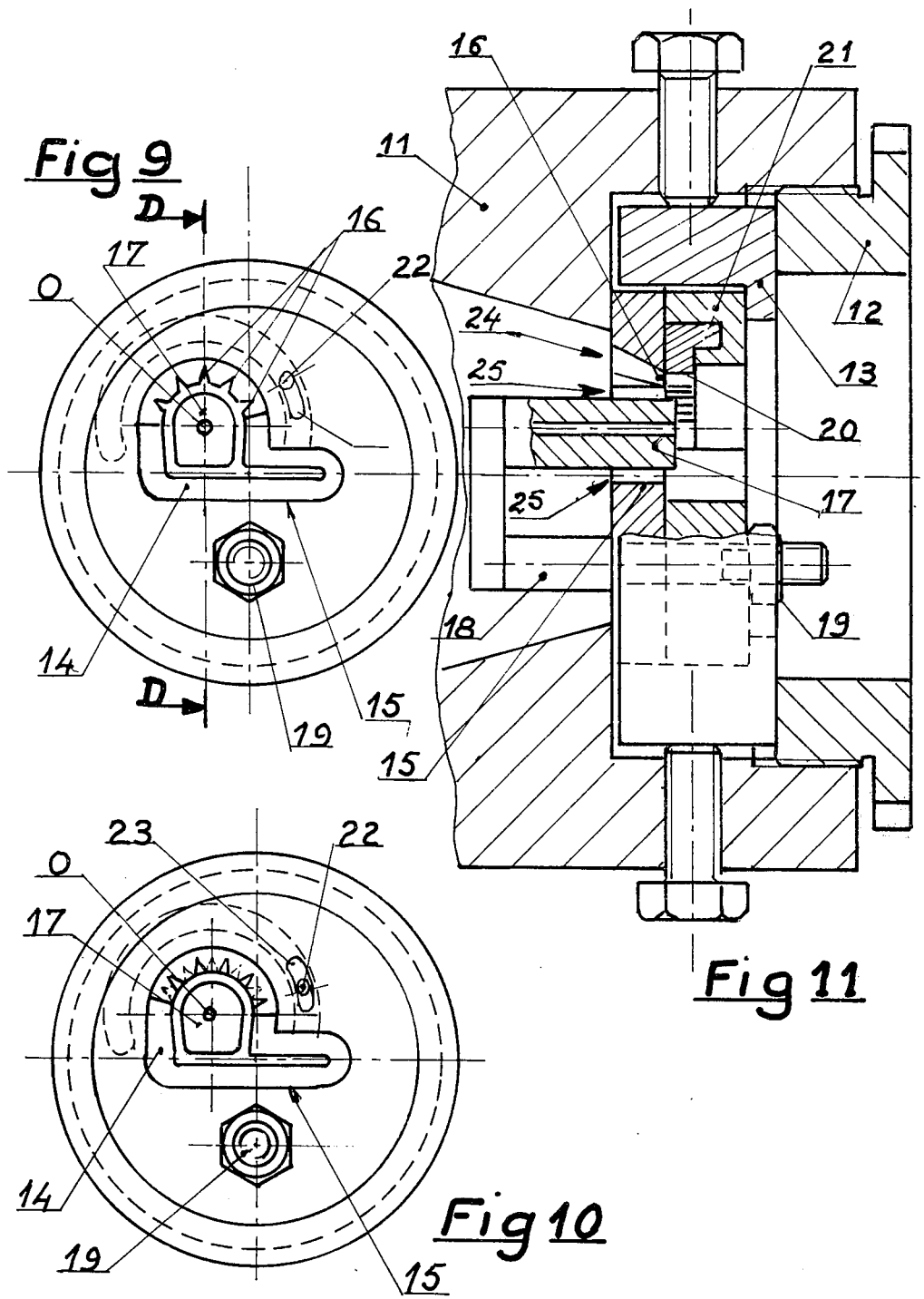

SEALING JOINTS FOR AUTOMOBILE BODY AND AN EXTRUSION HEAD FOR EXTRUDING SUCH JOINTS

The present invention relates to an extruded tubular sealing joint to be mounted along the edge of a closure element of an automobile body and to an extrusion head for making such joint.

Various types of extruded tubular sealing joints are already known, namely for use on automobile bodies. They are made of elastomeric material, either compact or cellular, and are often combined with a second reinforced U-shaped section to facilitate their mounting and clamping along the edges of all types of vehicle bodies.

However, when known joints of this type are mounted along the edges of vehicle body closure members that cause them to change plane abruptly, they flatten and this results in impairment or destruction of the sealing character of the joint. This is true whether or not the known joints are monolithic, that is made up of a U-shaped gripping section and a tubular sealing section made of compact rubber or, to the contrary, of the bi-component type, that is combining the aforesaid U-shaped gripping section, comprising a metal web embedded in compact rubber, with a sealing section again tubular but of cellular material.

No doubt various solutions have been proposed regarding the configuration of such joints at the critical predetermined locations, namely by additions or grafting of appropriately located auxiliary sealing lips but the known solutions are found expensive to apply.

It is therefore a main object of the present invention to provide such sealing lips in a cyclical and predetermined novel manner during the extrusion or parisoning operation of the said sealing sections without, in this manner, appreciably increasing the usual manufacturing costs.

More specifically, the invention provides an extruded tubular sealing joint to be mounted along the edge of a closure element of an automobile body and comprising: an elongated tubular member made of flexible extruded material and having a longitudinal sealing face adapted to come in contact with another closure element of the automobile body, in closed condition of the closure elements; at least one group of elongated parallel flexible sealing lips extending longitudinally of the tubular member and contiguously disposed transversely of the tubular member, the flexible sealing lips being intended to compensate for localized flattening of the tubular member and being integral with it.

In a preferred form of the invention, there are several such groups of sealing lips that are spaced from one another at distances predetermined by the location of the said flattening. Preferably also, the lips are generally triangular in crosssection and slender to provide sealing flexibility.

The invention also relates to an improved extrusion head, appropriate for the above-mentioned purpose in that, on the one hand, the slider having a rectilinear head and being moved in the same direction as the protuberances obtainable in a known extrusion die, is replaced by an obturator or diaphragm provided with a cut-out having the same shape as that of the extrusion die, for instance a comb-shaped cut-out, in combination with a relative displacement according to a generally rectangular orientation with the prior one and that, on the other hand, there is simultaneously achieved in the area of the beginning as well as of the end of these protuberances, tips that constantly have the shape of very flexible crests or lips whereas this was not the case previously where, because of the removal or truncation of the crests, it was not possible to obtain the corresponding flexibility which, nevertheless, is essential to obtain proper sealing.

More specifically, the invention is likewise directed towards an extrusion head for extruding a sealing joint, comprising: a die having a central core and an outer bored body spacedly surrounding the core to define therebetween a passage for the extrusion of an elongated tubular member; the outer body being formed along a portion of the bore thereof with contiguous lip-forming grooves opening into the extrusion passage; a diaphragm plate in contact with the outer body and having an inner surface corresponding in shape with the bore portion of the outer body and being formed with like contiguous grooves defining lips therebetween, and means rocking the diaphragm plate from a position wherein the lips of the diaphragm plate lie over the grooves of the outer body to obturate them and a position wherein the lips lie away from them to liberate them for the extrusion of flexible lips over a predetermined length of the tubular member.

According to a preferred extrusion head, the lipforming grooves are triangular in cross-section for the extrusion of flexible slender lips.

Specific embodiments of a sealing joint and of an extrusion head according to the invention will now be described with reference to the appended drawings wherein:

FIG. 1 is a perspective vertical view showing a portion of a post of an automobile body along the forward edge of which is provided a sealing joint of the usual by-component type;

FIGS. 2, 3 and 4 are cross-sectional views taken respectively along lines A—A, B—B and C—C;

FIG. 9 is an elevation front view of the central portion of an improved extrusion head made according to the present invention and shown in opening position of its obturation diaphragm;

FIG. 10 is a front elevation view similar to that of FIG. 9 but illustrating the obturation diaphragm in closed position, and FIG. 11 is a transverse cross-sectional view of the end of the extrusion head of FIGS. 9 and 10, taken along line D—D of FIG. 9.

According to the presently known technique, FIGS. 1 to 4 clearly show that, with a traditional sealing joint of the bi-component type made up in the usual manner of a U-shaped gripping section 1 for securing it by clamping over the free edge 2 of a post of the body 3 and co-acting with a tubular elastomeric cellular sealing section 4, if adequate sealing is provided along section A—A as shown in FIG. 2 due to proper predetermined compression of this tubular section 4, such is not the case at section B—B of FIG. 3 and even less at section C—C shown in FIG. 4 because the sealing joint suddenly changes plane in that area.

Figure 6:
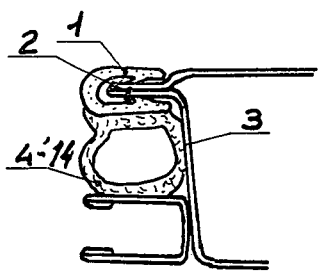
FIGS. 6, 7 and 8 are, respectively, cross-sectional views taken along line A'—A', B'—B' and C'—C' of FIG. 5.
Figure 7:
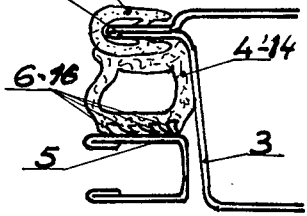
Figure 8:
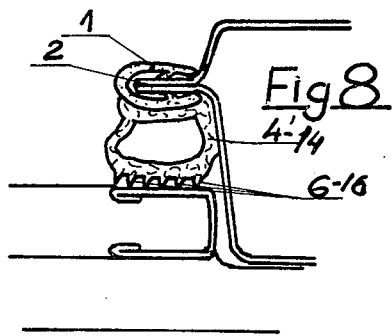
Figure 5:
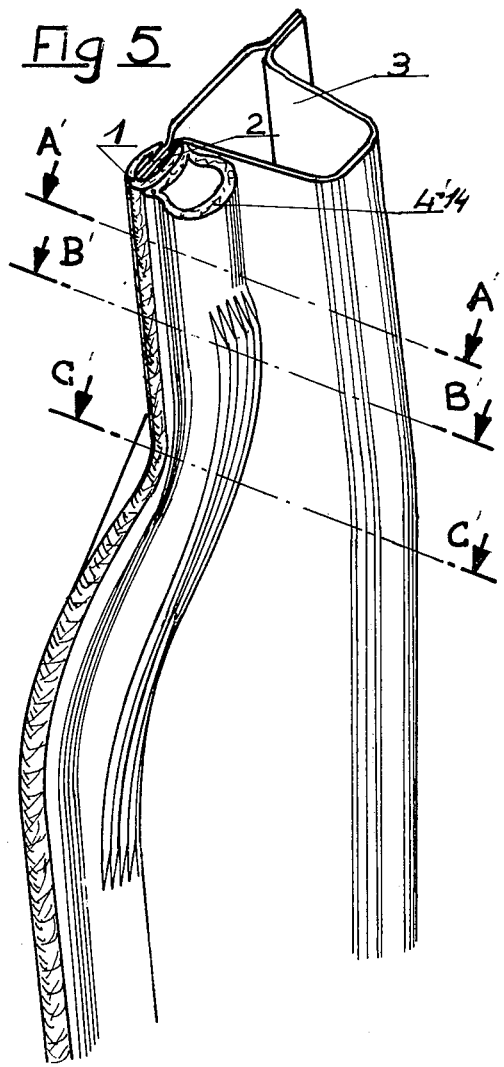
FIG. 5 is a perspective vertical view of a post of an automobile body wherein the lower edge thereof is provided with a sealing joint, of the bi-component type but made according to the teaching of the present invention.

With the sealing joint always of the bi-component type but improved according to the present invention as shown in the embodiment of FIGS. 5 to 8, to the contrary, the unavoidable flattening of the tubular sealing joint here designated 4' is compensated by its combination with projections formed as contiguous sealing lips 6 intended to close up the usual space left in that area as this has been clearly shown above with reference to FIGS. 3 and 4. It is therefore easy to understand that, according to FIGS. 7 and 8, there is provided a very simple solution to the problem which was previously costly to solve.

Indeed, because for several of important parts as is the case here or for a determined type of automobile doors, the aforesaid area where there is a sudden change in plane in the body and simultaneously flattening of the tubular sealing joint, is always located at the same place with respect to the ends of the said joint, it is then easy to provide added lips such as 6 at such locations in a cyclic and predetermined manner during the operation called sealing joint extrusion and this in a very simple manner as is already known but for other applications.

In this respect, if thus it was known to extrude elastomers according to variable cyclic sections, this was for entirely different applications for instance for the housing of a glass pane in a deflector at the location of the closing latch whereas it is proper to mention that here the object is entirely different as it tends to compensate for a flattening of the joint to achieve sealing.

It would then appear superfluous to describe in great detail the means necessary to achieve an extruded shape of variable cross-section and it would appear sufficient to point out that, in the case presently under consideration, it is sufficient to combine with the extrusion die, provided for the extrusion of the joint 4' with maximum projection of its auxiliary lips 6, a type of slider or register which slides perpendicularly and is appropriate for cyclically obturating the grooves of the said die capable of producing the said lips, by the action of a cam for instance or of any other control device whereas it suffices then to synchronize the movement of this slider with the extrusion speed of the tubular section or shape 4' so that the presence or absence of such lips 6 be carefully and cyclically arranged for instance by the use of at least one speed changer capable of appropriately providing the aforesaid control.

On the other hand, according to FIGS. 9 to 11, there is provided the usual extrusion head 11 having a nut 12 holding the gripping ring 13 containing an improved novel mechanism made according to the invention and adapted to achieve progressively and cyclically both the beginning and the end of the lips as overthicknesses on the extruded section 14.

In the particular case illustrated, the sealing lips are radially arranged about the upper periphery of the extruded section 14 having a center 0 relative to the extrusion die 15. The said die 15 determines the outer shape of the lips by means of the V-shaped grooves 16 whereas the bore of the extruded section is determined by the profile of a core 17 held in position by means of a stirrup and its nut 19. The progressive beginning and end of the lips 16 are conditioned by the combination of this extrusion die 15 with the rotary diaphragm 20, adjacent and concentric thereto, while having the same inner profile in regard to the circular portion having the grooves 16 which can be either aligned or mutually obturated.

The rotary diaphragm 20 rocks, with respect to the die 15, about a semi-circular rib thereof guided in a corresponding coaxial groove of a cross-piece 21 when a driving pin 22, of which it is provided, moves in a slot 23. This latter movement is achieved through a linkage mechanism, a jack or any other appropriate coupling system under the effect of a cam or of any other programmation means which, in combination with an auxiliary feed 24, arranged to co-act with a main elastomer feed 25, efficiently provides for the progessive beginning and end of the formation of the lips 16 having very fine and flexible crests, which was not previously the case.

Obviously, the same result could also be obtained, within the field of the invention, by a horizontal displacement of the diaphragm with respect to the die if protuberances in the form of vertical lips were considered.

Finally, although this is obvious, it is further specified that the invention is by no way limited to the sole new applications or combinations explicitly described and illustrated but, to the contrary, its field extends expressly to every embodiment or application and, namely, to those making use of equivalent or simply comparable means and processes, for instance by inversions or transposition of the described arrangements for the purpose of achieving the new improved industrial products and characteristics of the invention tending to achieve automatic compensation for the flattening of the sealing joint, namely in the case of sudden plane changes in the body even by thickness of superimposed sheet metal parts.

In this respect, it is further explicitly mentioned that it is within the field of the invention to achieve the beginning and the end of the lips in differential manner for instance by a system of individual autonomous cams where, for sealing purposes, it is necessary to use three lips on the joint of a front door and two only on the joint of a rear door.

I claim:

1. An extruded tubular sealing joint for mounting on a first closure element of an automobile body, said first closure element having a predetermined length made up of successive straight and angular portions forming a predetermined pattern, and said joint comprising:

an elongated, hollow tubular member made of flexible extruded material adapted to be mounted on said successive straight and angular portions of said first closure element, and having a longitudinal sealing face adapted to come in contact with a second closure element of said automobile body during movement of said first and said second closure elements into a closed, mating relationship, said second closure element having a predetermined length made up of successive straight and angular portions forming a predetermined pattern that is arranged to mate with said predetermined pattern of said first closure element; and a group of elongated parallel flexible sealing lips on said sealing face of said tubular member for each of said angular portions of said predetermined pattern of said first closure element, each group of sealing lips being extrudedly formed on and with said tubular member and extending longitudinally thereof, the portions of said tubular member extending between said groups being free of sealing lips, and said groups of sealing lips compensating for localized flattening of the tubular member occurring along said angular portions of said predetermined pattern of said first closure element when said tubular member is mounted thereon.

2. A sealing joint as claimed in claim 1, wherein said lips are generally triangular in cross-section and slender to provide sealing flexibility.

3. In an automobile body, in combination:
a first closure element having a predetermined length made up of successive straight and angular portions forming a predetermined pattern;
a second closure element having a predetermined length made up of successive straight and angular portions forming a predetermined pattern adapted to mate with said predetermined pattern of said first closure element, said first and second closure elements being arranged for relative movement toward and away from each other; and
a sealing joint mounted on said predetermined length of said first closure element, said sealing joint comprising: an elongated, hollow tubular member made of flexible extruded material and having a longitudinal sealing face adapted to come in contact with said second closure element during movement of said first and said second closure elements into a closed relationship; and a group of elongated parallel flexible sealing lips on said sealing face of said tubular member for each of said angular portions of said predetermined pattern of said first closure element, each group of sealing lips being extrudedly formed on and with said tubular member and extending longitudinally thereof, the portions of said tubular member extending between said groups being free of sealing lips, and said groups of sealing lips compensating for localized flattening of the tubular member occurring along said angular portions of said predetermined pattern of said first closure element when said tubular member is mounted thereon.

4. In an automobile body, the combination as recited in claim 3, wherein said lips are generally triangular in cross-section, of generally the same size, and slender to provide sealing flexibility.

* * * * *